United States Patent [19]

Frano

[11] Patent Number: 4,604,014

[45] Date of Patent: Aug. 5, 1986

[54] PALLET FASTENER

[75] Inventor: Francis G. Frano, Hoffman Estates, Ill.

[73] Assignee: Illinois Tool Works Inc., Chicago, Ill.

[21] Appl. No.: 630,157

[22] Filed: Jul. 12, 1984

[51] Int. Cl.⁴ .................... F16B 21/07; F16B 21/08
[52] U.S. Cl. .................... 411/338; 108/56.3; 411/78; 411/510
[58] Field of Search ............ 411/75, 76, 77, 78, 411/79, 338, 339, 455, 456, 508, 509, 510; 108/56.1, 56.3; 24/453, 575, 576, 577, 578, 574; 402/48, 52, 54

[56] References Cited

U.S. PATENT DOCUMENTS

| 2,201,551 | 5/1940 | Welk | 411/339 |
|---|---|---|---|
| 2,797,605 | 7/1957 | Metze et al. | 411/339 |
| 3,004,784 | 10/1961 | Selby | 411/508 X |
| 3,483,787 | 12/1969 | Saunders | 411/510 |
| 3,518,915 | 7/1970 | Gutshall | 411/39 |
| 3,647,306 | 3/1972 | Chamberlin | 411/339 X |
| 3,824,933 | 7/1974 | Lind | 108/56.1 |
| 4,128,253 | 12/1978 | Powers | 108/56.1 X |
| 4,267,781 | 5/1981 | Powers | 108/56.3 X |

FOREIGN PATENT DOCUMENTS

| 2334869 | 7/1977 | France | 411/510 |
|---|---|---|---|
| 520169 | 4/1940 | United Kingdom | 411/508 |
| 1362075 | 7/1974 | United Kingdom | 108/56.3 |

Primary Examiner—Thomas J. Holko
Attorney, Agent, or Firm—J. P. O'Brien; T. W. Buckman

[57] ABSTRACT

A two-part fastener made of resilient material is disclosed as comprising two identical mating fastening devices. Each fastening device is constructed with a circular disc head integrally formed with a shank. The shank has an elongate symmetrically-shaped body having a longitudinal central axis and is formed with a pair of leg members disposed along the central axis in diametrically opposed spaced apart relation. Each leg member is formed by two wall elements molded together in a V-shaped configuration wth the outer end portion laterally spaced apart from the adjoining leg member a distance sufficient to embracingly receive the pair of leg members of the identical fastening device. When the identical fastening devices are brought together in a nesting relationship, they are locked together by virtue of the interlocking cooperating relationship of a plurality of tooth formations formed on one of the two V-shaped wall elements of each leg member.

14 Claims, 6 Drawing Figures

PALLET FASTENER

BACKGROUND OF THE INVENTION

This invention relates to a two-part fastener made of resilient material, and in particular to a pair of identical mating fastening devices which can be quickly fastened together to provide a post construction. There is disclosed in U.S. Pat. No. 4,128,253 which issued to Richard J. Powers, a two-part fastener which can be coupled together. The two-part fastener cooperates with a cylindrical-shaped spacer member to form a pallet post.

This invention is directed to a two-part fastener which has identical mating parts for ease in manufacture and in assembly. The identical two-part fastening devices are quickly assembled together through the ratcheting action of cooperating intermeshing teeth carried on each fastening device.

Accordingly, an object of this invention is to provide an improved post construction that can be easily and quickly affixed together.

SUMMARY OF THE INVENTION

This invention is directed to a two-part fastener made of resilient material and constructed of a pair of identical fastening devices. Each fastening device is molded into a head and integrally formed shank. The shank is formed by a pair of leg members disposed along the longitudinal axis of the shank in diametrically opposed spaced apart relationship. Each of the leg members have two wall elements joined together along their radially inward edge and angularly disposed in a V-shaped configuration. The outer end portion of the leg members is spaced apart laterally from the opposing leg member to permit the nesting of the pair of leg members of the identical fastener device. The identical fastener devices are locked together by inter-engagement of a plurality of tooth formations formed on the outer wall surface of a V-shaped wall element for each of the leg members.

DESCRIPTION OF DRAWINGS

For a better understanding of this invention, reference may be made to the accompanying drawings, in which.

DESCRIPTION OF PREFERRED EMBODIMENT

Figure 3:
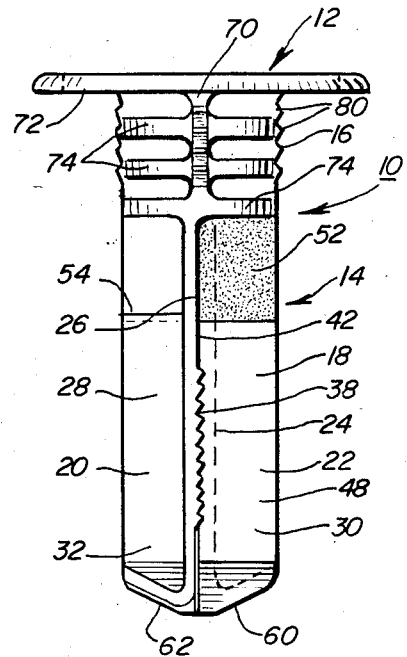
FIG. 3 is a side elevational view of one of the identical fastening devices for the two-part fastener embodying the principles of this invention.
Figure 4:
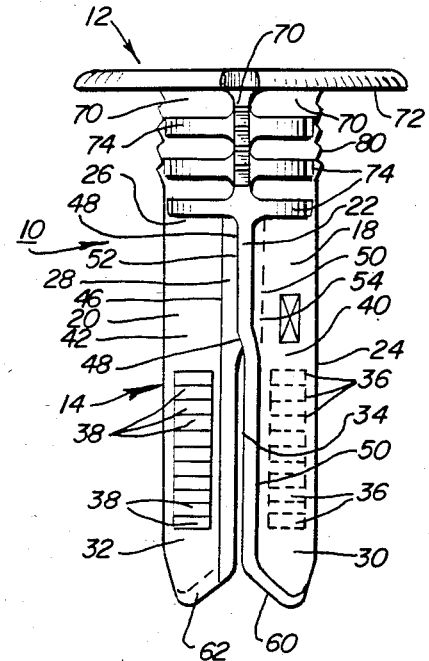
FIG. 4 is a side elevational view of the fastening device taken from the right side of FIG. 3.
Figure 5:
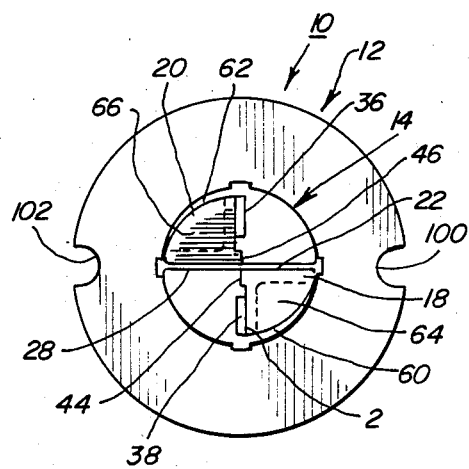
FIG. 5 is a bottom elevational view looking upwardly from the illustration depicted in FIG. 3.

Referring to FIGS. 3 and 4, there is depicted a fastening device generally designated by the reference numeral 10, which is integrally formed with a head 12 and a shank 14.

Figure 2:
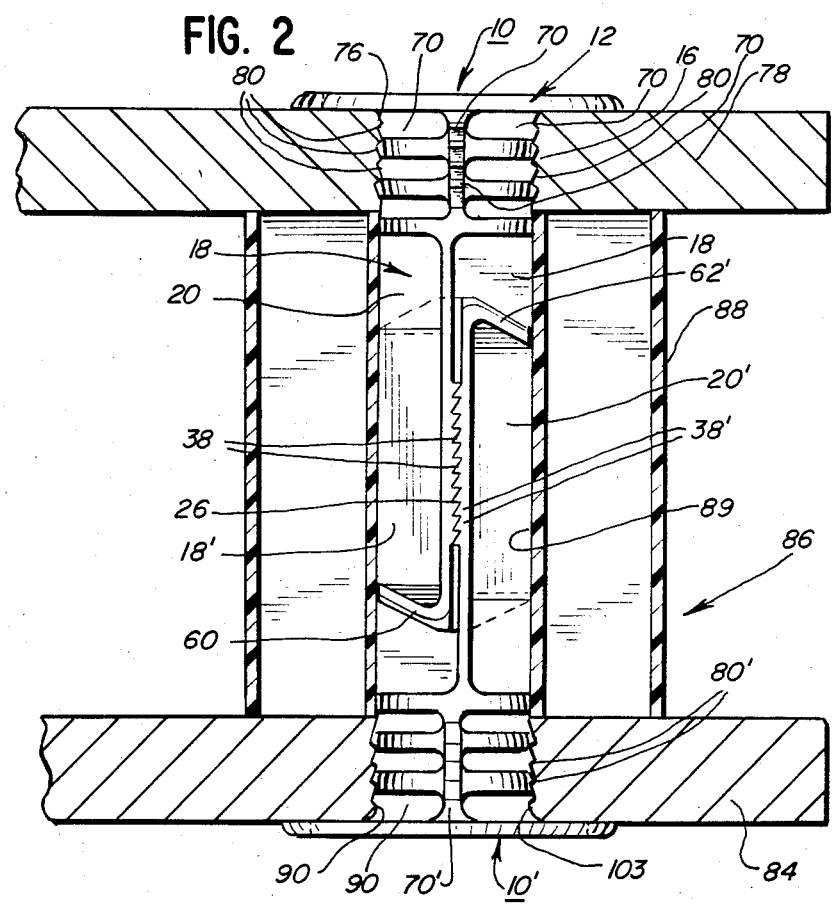
FIG. 2 is a cross-sectional view taken along the lines 2—2 of FIG. 1 and looking in the direction of the arrows.

Fastening device 10 and an identical fastening device 10' form a two-part fastener 11, which mate together as depicted in FIG. 2. Like parts of fastening device 10' will be designated by a prime number to the same part for fastening device 10.

The head 12 has a generally circular disc configuration. The shank 14 is integrally formed with the head 12 and extends from it in a normal relation. Shank 14 has a panel mounting portion 16 which interconnects the head 12 to a pair of leg members 18 and 20.

Leg member 18 is formed by two integrally connected wall elements 22 and 24 which are integrally joined together along their radial inward edge and angularly disposed in a V-shaped configuration. Likewise, leg member 20 has a pair of integrally formed wall members 26 and 28 joined along their inner radial edge in a V-shaped configuration.

The outer leg portion 30 of leg member 18 is laterally spaced apart a slight distance from the outer leg portion 32 of leg member 20 as indicated by slot 34 in FIG. 4 to enable the fastening device 10 to interconnect in a nesting relationship with an identical fastening device 10' in the manner depicted in FIG. 2.

On wall element 24 of leg member 18 and on wall element 26 of leg member 20 there are provided a plurality of tooth formations 36 and 38, respectively, along the outer end portion 30 and 32 of legs 18 and 20, respectively. The teeth are integrally formed on outer surfaces 40 and 42, respectively, of the leg members 18 and 20 to point towards head 12.

Also provided on wall surfaces 36 and 38 extending the entire length of leg members 18 and 20 are raised ledges 44 and 46 which extend along the radial inner edge of wall surfaces 36 and 38.

To guide the tooth formations 40 and 42 into a positive interlocking relationship with a corresponding set of tooth formations of the identical fastening device when they are brought together, each leg member 18 and 20 includes a ramp means which is formed on the wall surface 48 and 50 which face opposite to the plurality of tooth formations 36 and 38. As depicted in FIGS. 3 and 4, these ramp means comprise an offset ramp surface 52 that extends from the panel mounting portion 16 to the outer end portion 30 of leg member 18 on wall surface 48 of wall element 22. An identical offset portion 54 is provided on outer surface 50 of wall element 28.

One of the novel features of this invention is a ramp means 60 and 62 formed on the outer end portions 30 and 32 of leg members 18 and 20, respectively. Ramp means 60 and 62 are defined by ramp surfaces 64 and 66, respectively, that bridge across the outer ends of V-shaped wall elements 22, 24 and 26, 28, with each ramp surface 64 and 66 sloping inwardly towards the longitudinal central axis of shank 14 in the general direction of head 12.

The purpose of ramp surfaces 64 and 66 is to guide the mating pair of identical fastening devices 10 and 10' into a correct angular orientation so that the two sets of plurality of tooth formations 40 and 42 of fastener 10 will properly mate with the complementary pair of tooth formations 40' and 42' of identical fastening device 10'.

As illustrated in FIG. 2 the preferred embodiment can be used as the fastener for interconnecting a pair of thick panel members in a spaced apart relationship. For this purpose, the fastening device 10 includes a panel mounting portion 16. Panel mounting portion 16 has four radial wall members 70 which are spaced 90 degrees apart and which emanate on radial lines from the central axis of shank 14. Radial walls 70 are integrally connected to the inner surface 72 of circular disc head 12. The four radial wall members 70 are interconnected by three spaced apart integrally formed circular discs 74. The integrally formed molded radial wall members 70 with the three circular discs 74 and with head 12 provide a structurally strong panel mounting portion 16 as well as a rigid base support for the pair of leg members 18 and 20.

For purposes of holding the fastening device 10 in a mounting aperture, such as mounting aperture 76 in wall member 78 (FIG. 2), prior to it being fastened to the complementary mating fastening device 10', a plurality of teeth formations 80 are formed along the outer edge of the four radial walls 70. As depicted in FIGS. 3 and 4, these teeth formations 80 point generally in the direction of the head 12.

Figure 1:
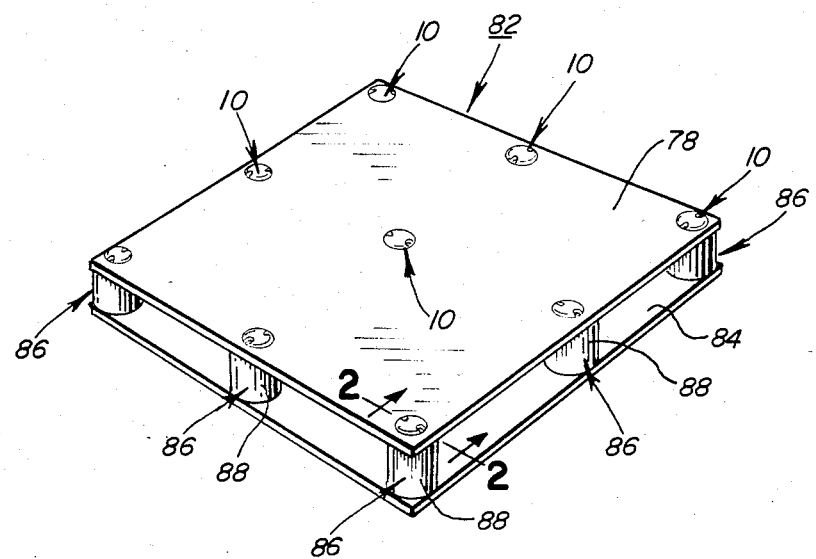
FIG. 1 is a perspective view of a pallet that has been constructed together using the two-part fastener of the present invention.

One use of the fastening device 10 is as the connecting fastener for a pallet post as illustrated in FIGS. 1 and 2. The pallet 90 is constructed by fastening together a pair of panel members 78 and 84 such as plywood boards in a parallel spaced apart relationship by the plurality of pallet posts 86. Each post 86 is formed by a hollow cylindrically shaped spacer member 88 (FIG. 2) and a pair of fastening devices 10 and 10' which are interconnected through openings 76 and 90, respectively, of panels 78 and 84.

One method of constructing the pallet 86 is to mount a fastening device 10 in apertures 76 at the nine locations of the top panel 78 such that each of the fasteners is held in the aperture 76 by virtue of the plurality of teeth projections 80 on the four radial walls 70.

Likewise, an identical fastening device 10' is inserted into aperture 90 of panel 84 with its plurality of teeth projections 80' biting into the sides of the aperture 90 to hold the fastening device 10' in place.

Cylindrical post 98 is then installed by placing its concentric central opening 89 placed over the shank 14'. It will be appreciated from FIG. 2 that the central mounting opening 89 is slightly larger in diameter than the cross-sectional dimension of shank 14'.

Figure 6:
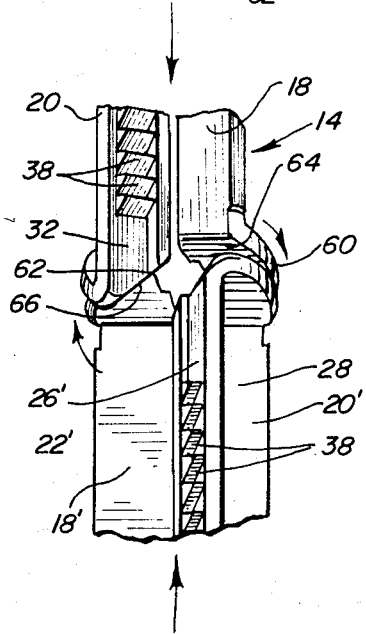
FIG. 6 is a partial perspective view illustrating the angular orientation of two identical fastening devices embodying the principles of this invention as they are brought together into an engaging interlocking relationship.

The top panel 78 is positioned at an elevated mounting position above panel 84 and lowered towards panel member 93 with the shank 14 of each fastening device 10 in direct alignment with the central opening 89 of spacer 88. As the outer end portions 30 and 32 of shank 14 come into contact with the complementary outer end portions 30' and 32' of shank 14', the pair of ramp surfaces 64 and 66 engage the corresponding ramp surfaces 64' and 66' of shank 14'. Further axial displacement of fastener device 10 towards fastening device 10' causes the plurality of tooth formations 40 and 42 of leg members 18 and 20, respectively, to be brought into alignment with one of the tooth formations 40' and 42' of leg members 18' and 20' as depicted in FIG. 6. Once the angular orientation is established, further inward axial forces on fastening device 10 and fastening device 10' as depicted by the arrows in FIG. 6 cause the plurality of mating teeth projections to ratchet together in an interlocking relation. Because the leg members are circumferentially confined within the concentric opening 89 of cylindrical spacer 88, the ratcheting action is made possible by virtue of the fact that the V-shaped configuration of the leg members permits the leg members to flex in a circumferential direction as the mating teeth ride over each other. Near the end of the stroke that couples the fastening devices 10 and 10' together, the ramp surfaces 64 and 66 of fastening device 10 engage the complementary surfaces 64' and 66' of fastening device 10' to exert a circumferentially directed force on the fastening devices 10 and 10' in equal and opposite direction to cause the mating teeth to be brought into firmer interlocking engagement.

Once the fastening devices 10 and 10' are brought together into the cooperating interlocking relationship depicted in FIG. 2, the resulting pallet post 96 becomes a very sturdy and rigid post capable of the same use as conventional pallets.

The pair of diametrically opposed slots 100, 102 are provided to enable the fastening devices 10 and 10' to be handled by a robotic machine.

Since the fastening devices 10 and 10' are of identical construction, they provide a two-part fastener that is economical to manufacture and convenient to utilize. Depending upon the field of usage, the fastening devices 10 and 10' may be made advantageously from a variety of suitable material, such as plastic or metal.

I claim:

1. A two-part fastener made of resilient material comprising a pair of identical fastening devices, each of said fastening devices including a head and shank, said shank having an elongate symmetrically-shaped body having a longitudinal central axis, said shank intergally formed at one end with said head in a normal relation to said longitudinal axis, said shank including a pair of leg members disposed along said longitudinal axis in diametrically opposed relation to each other, each of said leg members having two relatively thin planar wall elements joined together along there radial inward edge and angularly disposed in a V-shaped configuration, the outer end portion of said leg members spaced apart laterally a distance sufficient to embracingly receive the pair of leg members of said identical fastener, and a plurality of tooth formations pointing in the direction of said head from the outer wall surface of one of said two V-shaped wall elements for each of said leg members, the projection of said tooth formations from said outer wall surface being selected to cause the plurality of mating teeth to ratcher together in an interlocking relation as said pair of identical fastening devices are brought together such that the portion of each of said one of said thin planar wall elements which carry said plurality of tooth formations flex in a circumferential direction during the ratcheting action.

2. A two-part fastener as defined in claim 1, further comprising ramp means on the outer end of said pair of leg members for guiding said pair of fastening devices into a predetermined angular orientation about said longitudinal axis with respect to each other as said pair of fastening devices are brought together.

3. A two-part fastener as defined in claim 1, wherein said shank for each of said fastening devices further comprises a panel mounting portion between said head and said pair of leg members, said panel mounting portion comprising a plurality of radially extending ribs interconnected by a plurality of spaced circular discs.

4. A two-part fastener as defined in claim 3, wherein each of said panel mounting portions comprises a plurality of tooth formations pointing in the direction of said head formed on the outer edge of said radially extending ribs.

5. A two-part fastener as defined in claim 1, further comprising guide means on each of said pair of leg members for providing a rotational motion of said pair of fastening devices towards each other to cause said plurality of tooth formations of one fastening device to firmly engage with said plurality of tooth formations of the other fastening device as said pair of fastening devices are brought together.

6. A two-part fastener made of resilient material comprising a pair of identical fastening devices, each of said fastening devices including a head and shank, said shank having an elongate symmetrically-shaped body having a longitudinal central axis, said shank integrally formed at one end with said head in a normal relation to said longitudinal axis, said shank including a pair of leg members disposed along said longitudinal axis in diametrically opposed relation to each other, each of said leg members having two wall elements joined together along their radial inward edge and angularly disposed in a V-shaped cofiguration, the outer end portion of said leg members spaced apart laterally a distance sufficient to embracingly receive the pair of leg members of said identical fastener, a plurality of tooth formations pointing in the direction of said head from the outer wall surface of one of said two V-shaped wall elements for each of said leg members, and ramp means on the outer end of said pair of leg members for guiding said pair of fastening devices into a predetermined angular orientation about said longitudinal axis with respect to each other as said pair of fastening devices are brought together, said ramp means including a ramp surface formed across the outer end of said two V-shaped wall elements of each of said pair of leg members, said ramp surface sloping towards said longitudinal central axis and towards said one of said two V-shaped wall elements of the other of said leg members.

7. A two-part fastener made of resilient material comprising a pair of identical fastening devices, each of said fastening devices including a head and shank, said shank having an elongate symmetrically-shaped body having a longitudinal central axis, said shank integrally formed at one end with said head in a normal relation to said longitudinal axis, said shank including a pair of leg members disposed along said longitudinal axis in diametrically opposed relation to each other, each of said leg members having two wall elements joined together along their radial inward edge and angularly disposed in a V-shaped configuration, the outer end portion of said leg members spaced apart laterally a distance sufficient to embracingly receive the pair of leg members of said identical fastener, a plurality of tooth formations pointing in the direction of said head from the outer wall surface of one of said two V-shaped wall elements for each of said leg members, and guide means on each of said pair of leg members for providing a rotational motion of said pair of fastening devices towards each other to cause said plurality of tooth formations of one fastening device to firmly engage with said plurality of tooth formations of the other fastening device as said pair of fastening devices are brought together, said guide means on each of said pair of leg members including a raised shoulder portion on the outer wall surface of the other of said two V-shaped wall elements that axially extend towards said head from the inner margin of said plurality of tooth formations.

8. A two-part fastener made of resilient material comprising a pair of identical fastening devices, each of said fastening devices including a head and shank, said shank having an elongate symmetrically-shaped body having a longitudinal central axis, said shank integrally formed at one end with said head in a normal relation to said longitudinal axis, said shank including a pair of leg members disposed along said longitudinal axis in diametrically oppposed relation to each other, each of said leg members having two wall elements joined together along their radial inward edge and angularly disposed in a V-shaped configuration, a raised ledge portion extending longitudinally on the outer wall surface of one of said two V-shaped wall elements for each of said leg members and adjacent to said radial inward edge, the outer end portion of said leg members spaced apart laterally from each other a distance sufficient to embracingly receive the pair of leg members of said identical fastener and a plurality of tooth formations pointing in the direction of said head being integrally formed parallel to said raised ledge portion on said outer wall surface of said one of said two V-shaped wall elements for each of said leg members.

9. A two-part fastener as defined in claim 8, further comprising ramp means on the outer end of said pair of leg members for guiding said pair of fastening devices into a predetermined angular orientation about said longitudinal axis with respect to each other as said pair of fastening devices are brought together.

10. A two-part fastener as defined in claim 9, wherein said ramp means comprises a ramp surface formed across the outer end of said two V-shaped wall elements of each of said pair of leg members, said ramp surface sloping towards said longitudinal central axis and towards said one of said two V-shaped wall elements of the other of said leg members.

11. A two-part fastener as defined in claim 8, wherein said shank for each of said fastening devices further comprises a panel mounting portion between said head and said pair of leg members, said panel mounting portion comprising a plurality of radially extending ribs interconnected by a plurality of spaced circular discs, and wherein said head comprises a thin circular disc-shaped member substantially larger in diameter than said plurality of spaced circulr discs and integrally formed with said plurality of radially extending ribs.

12. A two-part fastener as defined in claim 11, wherein each of said panel mounting portions comprises a plurality of tooth formations pointing in the direction of said head formed on the outer edge of said radially extending ribs.

13. A two-part fastener as defined in claim 8, further comprising guide means on each of said pair of leg members for providing a rotational motion of said pair of fastening devices towards each other to cause said plurality of tooth formations of one fastening device to firmly engage with said plurality of tooth formations of the other fastening device as said pair of fastening devices are brought together.

14. A two-part fastener as defined in claim 13, wherein said guide means on each of said pair of leg members comprises a raised thickened portion on the outer wall surface of the other of said two V-shaped wall elements that axially extends towards said head from the inner margin of said plurality of tooth formations.

* * * * *